United States Patent [19]

Kohsaka

[11] Patent Number: 5,227,811
[45] Date of Patent: Jul. 13, 1993

[54] BASEPLATE FOR AN OPTICAL SCANNING DEVICE

[75] Inventor: Jun Kohsaka, Toyokawa, Japan

[73] Assignee: Minolta Camera Kabushiki Kaisha, Osaka, Japan

[21] Appl. No.: 960,267

[22] Filed: Oct. 13, 1992

Related U.S. Application Data

[63] Continuation of Ser. No. 840,841, Feb. 25, 1992, abandoned.

[30] Foreign Application Priority Data

Feb. 27, 1991 [JP] Japan .................. 3-032847

[51] Int. Cl.⁵ .................................. G01D 9/42
[52] U.S. Cl. .......................... 346/108; 346/160; 359/216
[58] Field of Search .................. 359/216–219; 358/481; 346/108, 160, 76 L; 355/67, 71, 233

[56] References Cited

U.S. PATENT DOCUMENTS

| | | | |
|---|---|---|---|
| 4,469,430 | 9/1984 | Terashima | 346/160 |
| 4,630,070 | 12/1986 | Sato | 346/108 |
| 4,774,531 | 9/1988 | Tokita | 346/160 X |
| 4,800,401 | 1/1989 | Sato et al. | 346/108 |
| 4,809,042 | 2/1989 | Homma | 346/76 L |
| 4,829,322 | 5/1989 | Ohmori | 346/108 |
| 4,847,644 | 7/1989 | Oda et al. | 346/160 |
| 5,064,260 | 11/1991 | Shiraishi | 346/108 X |

FOREIGN PATENT DOCUMENTS 64-82009  3/1989  Japan .

*Primary Examiner*—A. T. Grimley
*Assistant Examiner*—William J. Royer
*Attorney, Agent, or Firm*—Willian Brinks Olds Hofer Gilson & Lione

[57] ABSTRACT

An optical scanning device for scanning the surface of a photosensitive member with an optical beam emitted from a light source. The optical scanning device has a casing for accommodating a plurality of optical members. The casing is provided with a baseplate having a top surface, a bottom surface and a curved portion integrally formed with the top surface and the bottom surface so as to connect the top surface and the bottom surface. In the casing, the plurality of optical members are dividedly attached to the top and bottom surfaces of the baseplate, and therefore the curved portion is provided with an aperture for transmitting the optical beam therethrough.

20 Claims, 3 Drawing Sheets

BASEPLATE FOR AN OPTICAL SCANNING DEVICE

This application is a continuation of application Ser. No. 07/840,841, filed Feb. 25, 1992, now abandoned.

BACKGROUND OF THE INVENTION

1. Field of the Invention

The present invention relates to an optical scanning device for scanning the surface of a scanning member such as a photosensitive member or the like with an optical beam emitted from a light source. More specifically, the present invention relates to an optical scanning device provided with a casing having an assembly of optical members such as light source, mirror, lenses and the like.

2. Background of the Invention

Conventional optical scanning devices write image data on the surface of a photosensitive member by exposing the surface of said photosensitive member via an optical beam emitted from a light source and scanning the surface of the photosensitive member via an optical beam. Conventional optical scanning devices have optical members such as a light source for emitting an optical beam, rotatable polygonal mirror for reflecting said optical beam emitted by the light source, lens for projecting said reflected optical beam, mirrors for reflecting the optical beam that has passed through said lens toward the surface of a photosensitive member and like elements, all of which are accommodated within a casing. The aforesaid casing comprises a concave shaped optical box accommodating the mounted optical members and a cover fitted on the top of said optical box. The photosensitive member arranged beneath the aforesaid casing. Accordingly, an aperture must be provided in the optical box of the casing to emit the optical beam from the casing in order to expose the surface of the photosensitive member via the optical beam reflected by the mirror toward the surface of said photosensitive member.

The lengthwise orientation of the aforesaid aperture must coincide with the length of the optical beam main scanning direction, i.e., the axial direction of the photosensitive member, in order that the optical beam emitted through said aperture may scan the surface of the photosensitive member to write the image data thereon. The aperture must have a length substantially similar to the length of the photosensitive member in the axial direction and be positioned in near proximity to said photosensitive member. When the aperture has a length of the aforesaid substantially similar dimension and is formed in optical box wherein are mounted the optical members, said optical box is readily subject to distortions such that the relative positioning of the optical members mounted in said optical box cannot be uniformly maintained. Furthermore, when the relative positioning of the aforesaid optical members changes, the optical path of the emitted beam is subject to dislocation so as to preclude high-precision scanning via said optical beam.

Optical scanning devices have also been provided with a casing comprising an optical box having a cover disposed at the bottom side thereof, with said optical box being positioned on the top of said casing. In this arrangement, an aperture is not formed on said optical box accommodating the mounted optical members therein but rather said aperture is provided on the cover of said optical box, such that the cover is readily subject to distortion due to the aperture provided on said cover and further adversely affecting the relative positional relationships of the optical members. The mounting plane of the optical members of the optical box is essentially flat, i.e., said plane occupies the majority of the surface area of the casing, such that when, for example, a force is added in the direction of a distortion produced by a temperature rise within the apparatus via heat generated from the optical members within the casing, the relative positional relationships of the optical members within said casing changes causing a dislocation in the optical path of the beam so as to preclude high-precision scanning via said optical beam.

SUMMARY OF THE INVENTION

A main object of the present invention is to provide an optical scanning device capable of typically projecting an optical beam emitted from a light source onto the surface of a photosensitive member with a high degree of precision.

A further object of the present invention is to provide an optical scanning device capable of uniformly maintaining the positional relationships of the optical elements accommodated within the casing.

A still further object of the present invention is to provide an optical scanning device which does not produce distortion of the casing accommodating the optical elements.

These and other objects of the present invention are accomplished by providing an optical scanning device having a casing, and characterized by said casing being provided:

a baseplate having a top surface, a bottom surface and a curved portion integrally formed with said top surface and said bottom surface being interconnected by said curved portion;

first optical element attached to the bottom surface of the baseplate and containing a rotatable polygonal mirror device comprising a polygonal mirror for deflecting in a predetermined direction an optical beam emitted by a light source, and a driving device for rotating said polygonal mirror;

second optical element attached to the top surface of the baseplate and containing an image forming lens for forming images on the surface of a scanned member via the optical beam deflected by the rotatable polygonal mirror device of the first optical element;

aperture formed in the curved portion of the baseplate for transmitting said optical beam therethrough so that the optical beam deflected by the rotatable polygonal mirror arrives at the image forming lens.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
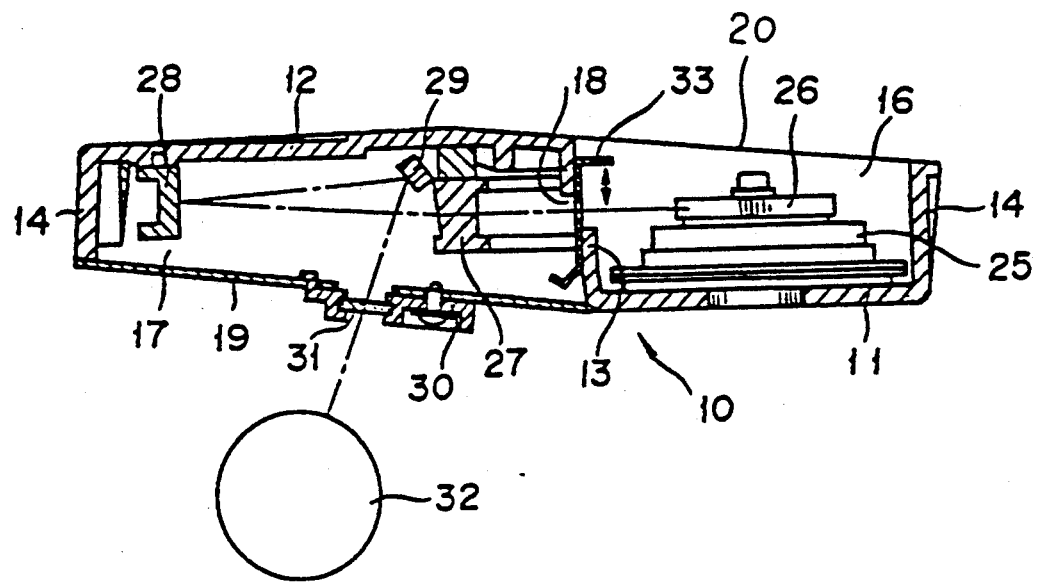
FIG. 1 is a section view showing an embodiment of the optical scanning device of the invention.

The casing 10 of the optical scanning device shown in FIG. 1 is provided with a curved and integrally formed baseplate. The aforesaid baseplate comprises first baseplate portion 11 forming the top surface of the baseplate, second baseplate portion 12 forming the bottom surface of the baseplate, and partition member 13 forming the curved portion of the baseplate and arranged substantially perpendicular to said top and bottom surface baseplate portions 11 and 12. The partition member 13 is positioned substantially in the center portion of the baseplate. The periphery of the baseplate comprises an exterior wall portion 14 integratedly formed with the baseplate. The aforesaid exterior wall portion 14 extends in one direction from the first baseplate portion 11 and extends in an opposite direction from the second baseplate portion 12. The first compartment 16 is formed by the first baseplate portion 11, partition member 13 and exterior wall portion 14, and the second compartment 17 is formed by the second baseplate portion 12, partition member 13 and exterior wall portion 14, such that both first and second compartments 16 and 17 are respectively formed in the interior of the casing 10.

Figure 2:
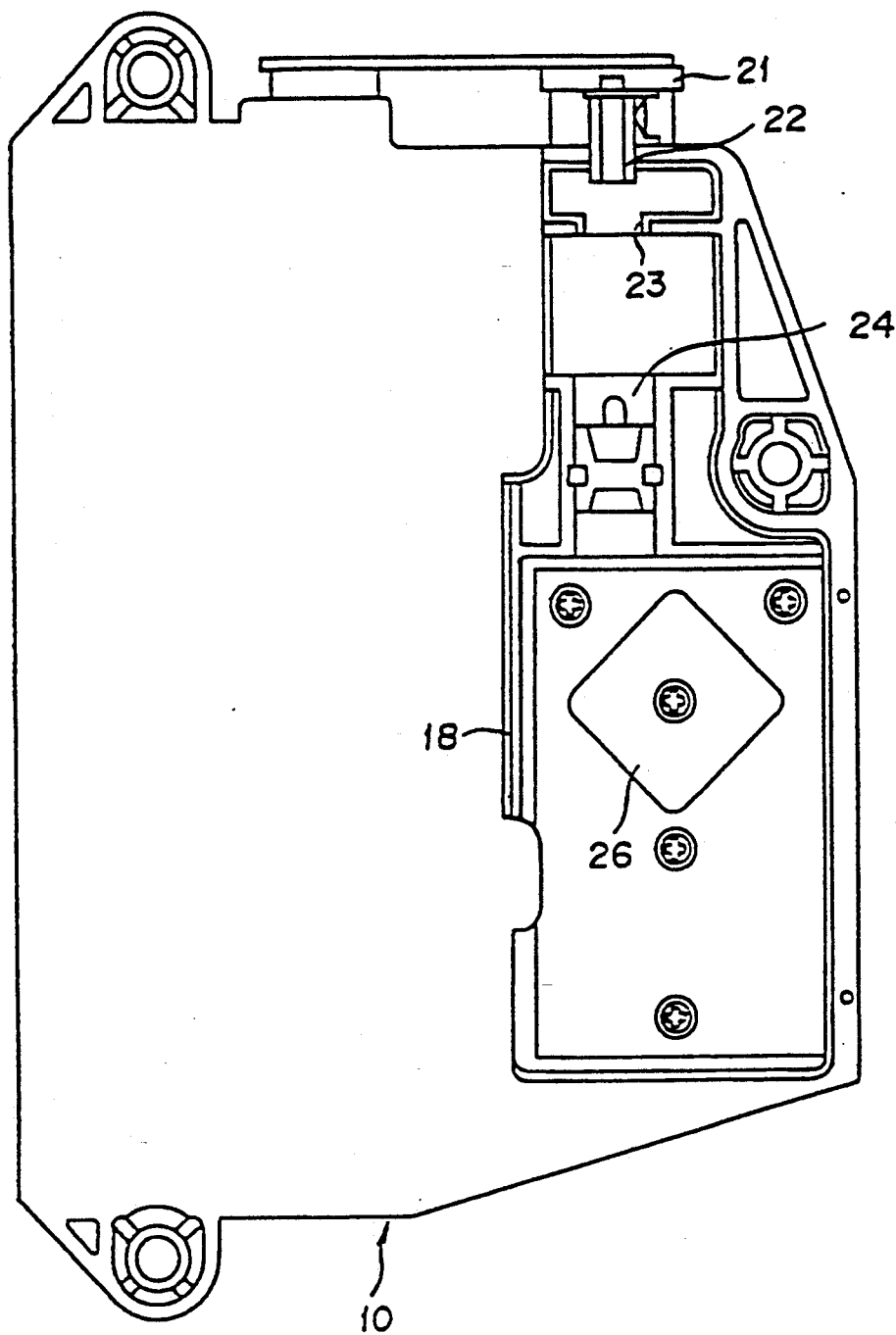
FIG. 2 is a top plan view of the optical scanning device of FIG. 1.

A cover 20 is provided at the top of the first compartment 16; details of the interior construction of said first compartment 16 with the cover 20 removed are shown in FIG. 2. The light source 21, collimator lens 22, slit 23, cylindrical lens 24, motor 25, and polygonal mirror 26 rotated by said motor 25 are mounted on the first baseplate portion 11 of the first compartment 16.

Figure 3:
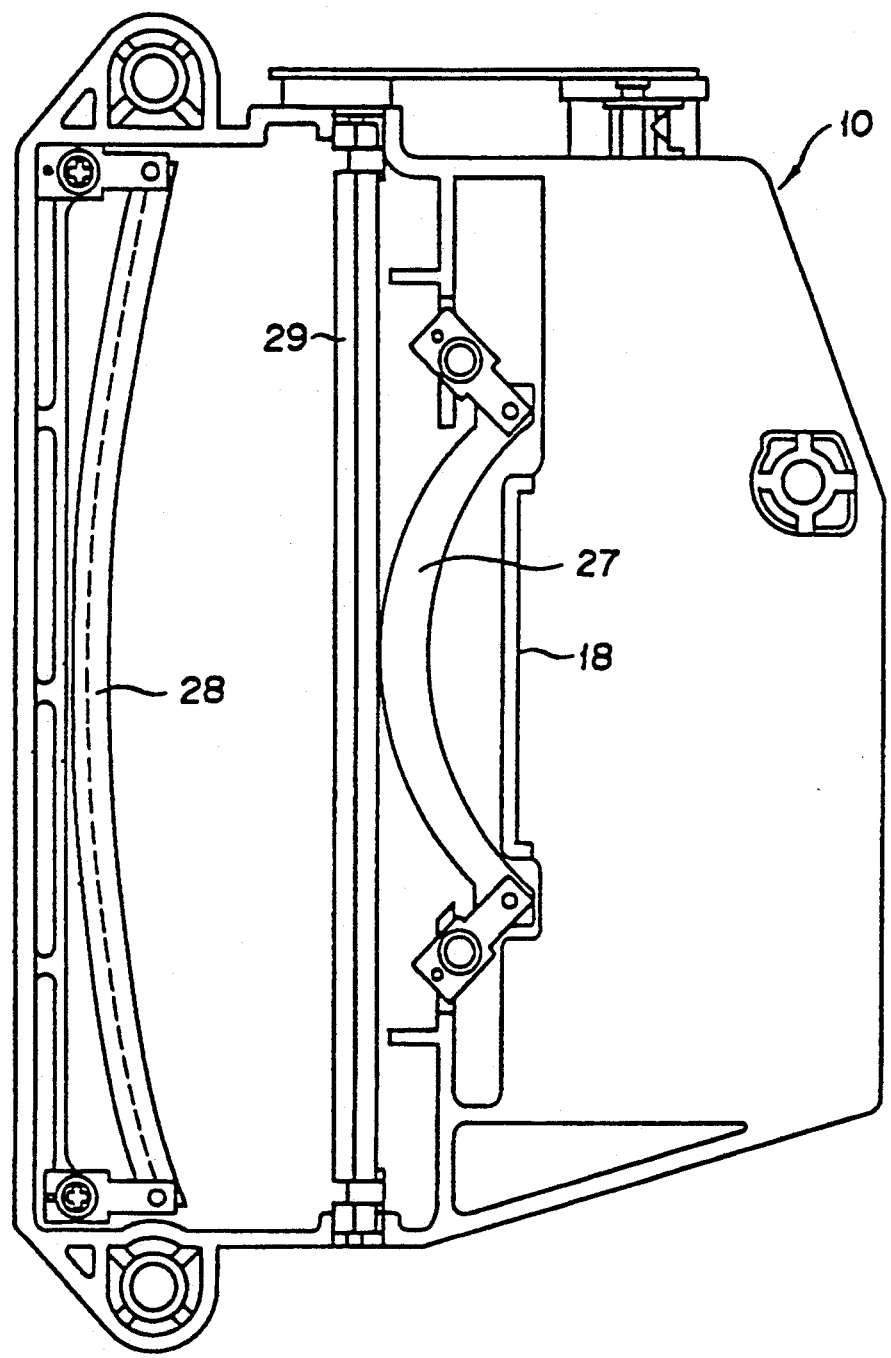
FIG. 3 is a bottom plan view of the optical scanning device of FIG. 1.

A cover 19 is provided at the bottom of the second compartment 17, as shown in FIG. 1. Attached to said cover 19 is a holder 30 provided with a fixedly attached transparent plate 31. The aforesaid transparent plate 31 is fixedly mounted so as to cover the aperture formed in the cover 19. Details of the interior construction of said second compartment 17 with the cover 19 removed are shown in FIG. 3. A toric lens 27, fθ mirror 28 and reflecting mirror 29 are mounted on the second baseplate portion 12 of the second compartment 17.

Furthermore, an aperture 18 is provided in the partition member 13 that separates the aforesaid first and second compartments 16 and 17.

The optical path of an optical beam from its emission from a light source to its exposure on the surface of a photosensitive member in an optical scanning device having the previously described construction is described hereinafter.

A laser beam is emitted from the light source 21 (laser diode) accommodated in the first compartment 16 is collimated by the collimator lens 22, passes through the slit 23, and arrives at the cylindrical lens 24. The laser beam that has passed through the cylindrical lens 24 is reflected by the reflecting surface of the polygonal mirror 26 that is rotated via the motor 25. The laser beam that has been reflected by the polygonal mirror 26 passes through the aperture 18 formed in the partition member 13, and arrives at the toric lens 27 in the second compartment 17. The laser beam that has passed through the aforesaid toric lens 27 is reflected by the fθ mirror 28 and arrives at the reflecting mirror 29 (refer to FIGS. 2 and 3). The laser beam reflected by the reflecting mirror 29 is transmitted through the transparent plate 31, and exposed on the surface of the photosensitive member 32 disposed outside the casing 10 (refer to FIG. 1).

The baseplate of the optical scanning device of the present invention described above comprises a first baseplate portion, second baseplate portion and partition member 13 arranged substantially perpendicular to said first and second baseplate portions and positioned substantially in the center portion of the baseplate so as to interconnect said first and second baseplate portions. Accordingly, the rigidity of the casing overall is extremely high so that distortion of the casing resulting from temperature elevation within the device is prevented.

In the optical scanning device of the present invention, the light source 21, collimator lens 22, cylindrical lens 24 and rotatable polygonal mirror 26 are accommodated in the first compartment 16 of the casing, and toric lens 27, fθ mirror 28 and reflecting mirror 29 are accommodated in the second compartment 17 of the casing, and an aperture 18 is provided in the partition member 13 positioned between the rotatable polygonal mirror 26 and the toric lens 27 so as to allow the passage therethrough of the laser beam from the first compartment 16 into the second compartment 17. Since the aperture 18 is provided between the rotatable polygonal mirror 26 and the toric lens 27 the deflection width of the laser beam passing through the aforesaid aperture 18 is only ⅓ the deflection width of the laser beam transmitted through the transparent plate 31 after having been reflected by the reflecting mirror 29, as can be clearly understood from FIGS. 2 and 3. That is, the aperture 18 is formed with a relatively small length in the partition member 13. Thus, the rigidity of the partition member 13 itself is not reduced even though the aforesaid aperture 18 is formed in said partition member 13.

Furthermore, in the casing of the optical scanning device of the present invention, the aperture through which passes the laser beam emitted from a light source to expose the surface of the photosensitive member is not formed in a baseplate on which are mounted the optical elements but rather is formed in the cover 19. Therefore, the aforesaid aperture does not adversely or otherwise affect the relative positional relationships of the aforesaid optical elements.

Figure 4:
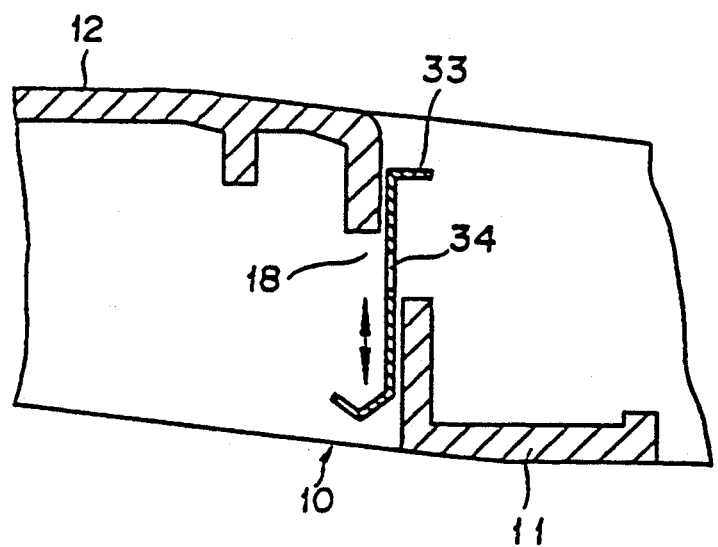
FIG. 4 is a section view showing a partial enlargement of the partition member of the optical scanning device of FIG. 1.

As shown in FIG. 4, the partition member 13 is provided with a shutter 33 that is oscillatable in the arrow direction to open and close the aforesaid aperture 18. The shutter 33 is provided with a slit 34 formed therein to allow the passage of the laser beam. The shutter 33 is positioned such that the slit 34 normally overlays the aperture 18. Accordingly, when the printer body is opened for maintenance or jam processing (e.g., the tip frame is opened in the case of a clamshell type printer), the aforesaid shutter 33 is oscillatably moved so as to block the aperture 18 and thereby prevent the beam emitted by the light source 21 from passing therethrough. Thus, the first compartment 16 and the second compartment 17 can be mechanically isolated by blocking the aperture 18 via moving the oscillatable shutter 33, thereby assuring the safety of an operator. Moreover, the aforesaid shutter 33 can be formed by a compact member also used as a support member for the partition member 13 because said shutter 33 is provided for the aperture 18 that has a length that is relatively shorter than a conventional aperture of similar purpose. The oscillation of the aforesaid shutter 33 may be accomplished using a driving means such as a solenoid or the like, and may be actuated via an interlocking means with the operation opening an closing the cover or like member of the image forming apparatus.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical scanning device for scanning the surface of a photosensitive member with an optical beam emitted from a light source, said optical scanning device comprising:
    a baseplate which is bent so as to form a bent portion thereat; and
    a plurality of optical members dividedly attached to a front surface and a back surface of said bent baseplate in demarcation of said bent portion.

2. An optical scanning device as claimed in claim 1 wherein the bent portion is formed substantially perpendicular to the front and back surfaces of the baseplate and positioned substantially in the center portion of the baseplate.

3. An optical scanning device for scanning the surface of a photosensitive member with an optical beam emitted from a light source, said optical scanning device comprising:
    a baseplate having a top surface, a bottom surface and a curved portion integrally formed with the top surface and the bottom surface so as to connect the top surface and the bottom surface;
    a plurality of optical members attached to the baseplate dividedly at the top and bottom surfaces of the baseplate; and
    an aperture formed in the curved portion of the baseplate for transmitting the optical beam therethrough.

4. An optical scanning device as claimed in claim 3 wherein said aperture is provided with a shutter member movable so as to open and close the aperture.

5. An optical scanning device as claimed in claim 3 wherein the curved portion is arranged substantially perpendicular to the top and bottom surfaces of the baseplate and positioned substantially in a center portion of the baseplate.

6. An optical scanning device as claimed in claim 3 wherein the bottom surface of the baseplate is provided with the light source, a rotatable polygonal mirror device comprising a polygonal mirror for deflecting the optical beam emitted from the light source in a predetermined direction and a driving device for rotating said polygonal mirror, and the top surface of the baseplate is provided with a lens for further deflecting the optical beam transmitted through the aperture and a reflecting mirror for causing the optical beam deflected by the lens to be incident on the surface of the photosensitive member.

7. An optical scanning device as claimed in claim 6 wherein a deflection width of the optical beam passing through the aperture is smaller than a deflection width of the optical beam incident upon the surface of the photosensitive member.

8. An optical scanning device for scanning the surface of a photosensitive member with an optical beam emitted from a light source, said optical scanning device comprising:
    a baseplate having a first portion, a second portion and a third portion integrally formed with said first and second portions so as to connect the first and second portions;
    a plurality of optical members attached to the baseplate dividedly at the first and second portions of the baseplate; and
    an aperture formed in the third portion of the baseplate for transmitting the optical beam therethrough.

9. An optical scanning device as claimed in claim 8 wherein said aperture is provided with a shutter member movable so as to open and close the aperture.

10. An optical scanning device as claimed in claim 8 wherein the third portion is arranged substantially perpendicular to the first and second portions of the baseplate and positioned substantially in the center portion of the baseplate.

11. An optical scanning device as claimed in claim 8 wherein the first portion of the baseplate is provided with the light source, a rotatable polygonal mirror device comprising a polygonal mirror for deflecting the optical beam emitted from the light source in a predetermined direction and a driving device for rotating said polygonal mirror, and the second portion of the baseplate is provided with a lens for further deflecting the optical beam transmitted through the aperture and a reflecting mirror for causing the optical beam deflected by the lens to be incident on the surface of the photosensitive member.

12. An optical scanning device as claimed in claim 8 wherein the deflection width of the optical beam passing through the aperture is smaller than the deflection width of the optical beam incident upon the surface of the photosensitive member.

13. An optical scanning device for scanning the surface of a photosensitive member with an optical beam emitted from a light source, said optical scanning device comprising:
    a baseplate having a top surface, a bottom surface and a curved portion integrally formed with the top surface and the bottom surface so as to connect the top surface and the bottom surface;
    a first optical member attached to the bottom surface of the baseplate and containing a rotatable polygonal mirror device comprising a polygonal mirror for deflecting in a predetermined direction the optical beam emitted from the light source, and a driving device for rotating said polygonal mirror;
    a second optical member attached to the top surface of the baseplate and containing a lens for forming images on the surface of the photosensitive member with the optical beam deflected by the rotatable polygonal mirror device of the first optical member; and
    an aperture formed in the curved portion of the baseplate for transmitting the optical beam therethrough so that the optical beam deflected by the rotatable polygonal mirror arrives at the lens.

14. An optical scanning device as claimed in claim 12 wherein said aperture is provided with a shutter member movable so as to open and close the aperture.

15. An optical scanning device as claimed in claim 12 wherein the curved portion is arranged substantially perpendicular to the top and bottom surfaces of the baseplate and positioned substantially in a center portion of the baseplate.

16. An optical scanning device for scanning the surface of a photosensitive member with an optical beam emitted from a light source, said optical scanning device comprising:

a baseplate having a first portion, a second portion and a third portion integrally formed with said first and second portions so as to connect the first and second portions;

a first optical member attached to the first portion of the baseplate and containing a rotatable polygonal mirror device comprising a polygonal mirror for deflecting in a predetermined direction the optical beam emitted from the light source, and a driving device for rotating said polygonal mirror;

a second optical member attached to the second portion of the baseplate and containing a lens for forming images on the surface of the photosensitive member with the optical beam deflected by the rotatable polygonal mirror device of the first optical member; and an aperture formed in the third portion of the baseplate for transmitting the optical beam therethrough so that the optical beam deflected by the rotatable polygonal mirror arrives at the lens.

17. An optical scanning device as claimed in claim 16 wherein said aperture is provided with a shutter member movable so as to open and close the aperture.

18. An optical scanning device as claimed in claim 16 wherein the third portion is arranged substantially perpendicular to the first and second portions of the baseplate and positioned substantially in the center portion of the baseplate.

19. A method performed in an optical scanning device provided in an image forming apparatus and accommodating a plurality of optical members in a casing, said method comprising the steps of:

providing in the casing of the optical scanning device a baseplate having a top surface, a bottom surface and a curved portion integrally formed with the top surface and the bottom surface so as to connect the top surface and the bottom surface;

disposing the optical members dividedly at the top and bottom surfaces; and forming an aperture at the curved portion of the baseplate.

20. A method as claimed in claim 19 further comprising the step of:

providing a movable shutter member over the aperture of the baseplate so as to open and close the aperture.

* * * * *

UNITED STATES PATENT AND TRADEMARK OFFICE
CERTIFICATE OF CORRECTION

PATENT NO. : 5,227,811
DATED : July 13, 1993
INVENTOR(S) : Jun Kohsaka

It is certified that error appears in the above-indentified patent and that said Letters Patent is hereby corrected as shown below:

In Col. 6, line 63 (Claim 14, line 1), change "12" to --13--.

In Col. 6, line 66 (Claim 15, line 1), change "12" to --13--.

Signed and Sealed this

Fifth Day of April, 1994

Attest:

BRUCE LEHMAN

*Attesting Officer*  *Commissioner of Patents and Trademarks*